E. L. COLQUITT & H. P. SPENCER.
COUPLING FOR AUTOMOBILES.
APPLICATION FILED APR. 22, 1916.
1,198,329.
Patented Sept. 12, 1916.
2 SHEETS—SHEET 1.
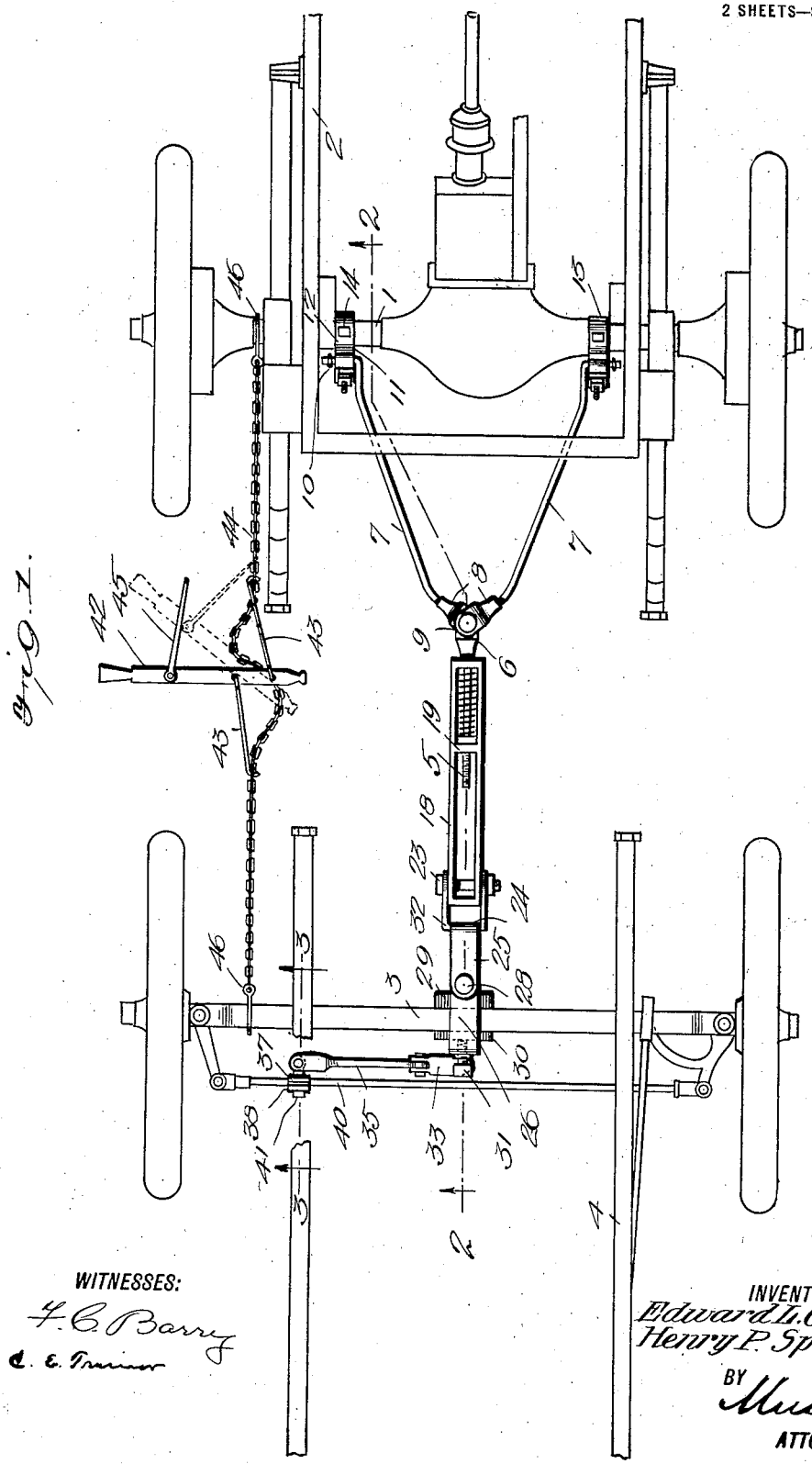
WITNESSES:
INVENTORS.
Edward L. Colquitt
Henry P. Spencer
BY
ATTORNEYS

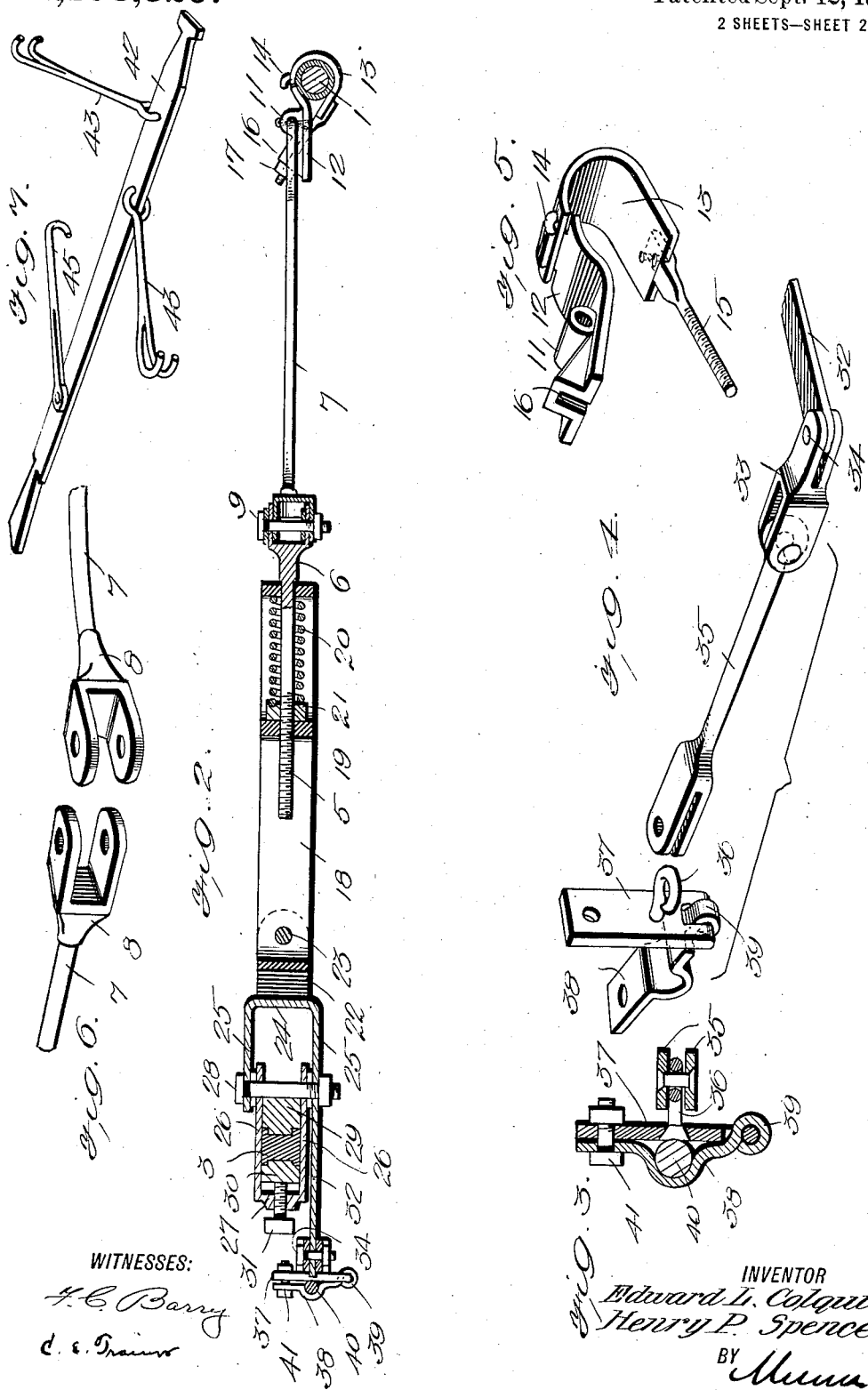

UNITED STATES PATENT OFFICE.

EDWARD LEE COLQUITT AND HENRY PETWAY SPENCER, OF SHELBYVILLE, TENNESSEE.

COUPLING FOR AUTOMOBILES.

1,198,329.  Specification of Letters Patent.  Patented Sept. 12, 1916.

Application filed April 22, 1916. Serial No. 92,888.

*To all whom it may concern:*

Be it known that we, EDWARD L. COLQUITT and HENRY P. SPENCER, citizens of the United States, and residents of Shelbyville, in the county of Bedford and State of Tennessee, have invented new and useful Improvements in Couplings for Automobiles, of which the following is a specification.

Our invention is an improvement in couplings for automobiles, and has for its object to provide a coupling of the character specified for permitting a relief automobile to be coupled to a dead car for instance, in such manner that the dead car will follow the relief car, and will be turned or guided in the proper manner and without undue strain on either car.

Referring to the drawings, Figure 1 is a top plan view of the coupler in use, Figs. 2 and 3 are sections on the lines 2—2 and 3—3 respectively of Fig. 1, each view looking in the direction of the arrows adjacent to the line, Fig. 4 is a perspective view of the connection for the steering arm connecting bar, Fig. 5 is a perspective view of one of the clamps for the rear axle, Fig. 6 is a detail perspective view of a connection, and Fig. 7 is a similar view of the operating bar.

Referring to Fig. 1, it will be seen that the coupling is arranged between the rear axle 1 of the relief car 2 and the front axle 3 of the dead car 4, and the improved coupling is composed of a portion connected with the rear axle 1 and a portion connected with the front axle 3. The first named portion consists of a rod 5 which is threaded at one end and provided at the other end with a head 6 having a pair of vertically spaced perforated lugs. Links 7 connect the head 6 with the rear axle, each link 7 having a head 8 provided with spaced perforated lugs, which are adapted to engage with the lugs 6 of the rod 5, and a bolt and nut 9 connect the several lugs, the bolt passing through the registering perforations and being engaged by the nut to clamp the parts together. The links 7 are thus pivoted to the rod.

The front end of each link 7 is turned outwardly as shown at 10, and each of these out turned ends is engaged with a transverse bearing 11 on a clamp, one of which is shown in detail in Fig. 5. Each of these clamps consists of a section 12 and a section 13, hinged together at 14, by passing a hook on one through a transverse slot in the other, and the section 13 is provided with a threaded stem 15 which is adapted to be received in an inclined groove 16 in the section 12 and to be engaged by a nut 17 to clamp the parts on the housing of the rear axle 1. This groove 16 is formed on the under side of the section 12 and when the sections 12 and 13 are engaged with the axle as shown in Fig. 2, the threaded stem 15 fits within the groove and extends beyond the same, in a position to be engaged by the nut. Then when the nut is turned on the stem the clamp is clamped firmly on the axle.

The threaded rod 5 is passed through one end of a substantially rectangular frame 18, and through a transverse web 19 intermediate the ends of the frame, and a coil spring 20 encircles the rod between the web and the end of the frame. This spring bears at one end against the end of the frame and at the other against a stop nut 21 which is threaded onto the rod, and by means of which the tension of the spring may be adjusted. The opposite end of the frame is received between a pair of parallel lugs 22 integral with the body 24 of a clip, and extending in the opposite direction to the arms 25 of the clip, which are also parallel, and in parallel planes at right angles to the planes of the lugs 22.

The arms 25 of the clip engage above and below the arms 26 of a substantially U-shaped clamp support consisting of the said arms and a body 27, and adapted to engage the front axle 3 of the dead vehicle. The arms 25 are pivoted to the arms 26 on a vertical axis, by means of a bolt 28, and washers are arranged between the arms. The axle 3 is received between the arms 26 of the clamp support, and clamping blocks 29 and 30 are also arranged between the arms on opposite sides of the axle. The block 29 bears against the bolt 28 and a set screw 31 is threaded through the body 27 and engages the block 30, to press it toward the axle, and to clamp the axle between the blocks 29 and 30.

The lower arm 25 of the clip 24 is extended beyond the axle as indicated at 32, and one end of a hinge plate 33 is pivotally connected to the extension 32, as indicated at 34, and the other end is pivoted to the one end of a link 35. The opposite end of the link has a fork whose arms engage opposite sides of an eye 36 on one of the sections 37 of a clamp, and the arms are pivoted to the eye by means of a rivet, as shown. The clamp of which the section 37 is a part, consists of two members, namely, the section 37 and a section 38, and these sections are hinged together as indicated at 39. The section 37 is merely a plane plate, but the section 38 has a transverse groove for receiving the connecting rod 40 for the steering knuckles, and by means of a bolt and nut 41, the two sections may be clamped on the connecting rod, the bolt being at the opposite ends of the sections from the hinged connection 39. The hinge plate 33, the link 35, and the clamp 37—38, provides a connection between the extension 32 and the connecting rod for the steering knuckles, and when the clip 24 and the frame 18 swing laterally at an angle to the axle 3, the wheels of the rear or dead vehicle will be turned in the same direction as the said elements swing, to guide the vehicle.

The connection between the two cars is a yielding connection, and the extent of resiliency between the two may be varied by means of the coil spring 20. The pivotal connection at 9 permits the lateral movement of the two axles with respect to each other, as does also the connection at 28. The connection at 23 permits vertical movement of the axles with respect to each other, and the connection is not only yielding, but exceedingly flexible. The entire device may be quickly applied or detached, it only being necessary to connect the clamps 12 and 13 to the rear axle of the relief car, and the clamps 26—27 and 37—38 to the front axle and the connecting rod respectively.

The device is intended to be handled by a single man, and in order to facilitate the attachment, the mechanism shown in Figs. 1 and 7 is provided. The said mechanism comprises a lever 42, having at one end a handle, and provided near the other end with hooks 43, which are hinged to the lever in spaced relation. Each hook is forked at its outer end and the arms of the forks are bent to form the hooks, and are adapted to engage the chain 44 shown in Fig. 1, at opposite sides of the lever. A third hook 45 is pivoted to the lever adjacent to the handle or grip, and this hook is also adapted to engage a link of the chain 44, as indicated in dotted lines in Fig. 1, to hold the lever 42 in adjusted position. The chain 44 is provided at each end with a hook 46, and these hooks are adapted to engage the axles 1 and 3, as shown in Fig. 1, and the chain has a greater aggregate length between the hooks than the aggregate length of the coupling. In the use of this mechanism, the hooks 46 are engaged with the respective axles in the manner shown in Fig. 1, and the hooks 43 are engaged with the links of the chain in the manner shown in Fig. 1, at opposite sides of the lever. The lever may be swung toward the axle 3, for instance, to permit the hooks 43 to be engaged with the chain. When now, the handle end of the lever is swung toward the axle 1, it will be evident that the hooks 43 will be moved toward each other thus tautening the chain, and the chain may be held in this position by engaging the hook 45 with a link of the chain, as indicated in dotted lines in Fig. 1. This mechanism is used only when it is necessary to move the cars for short distances into proper position to connect the coupling mechanism.

While the coupling is of especial advantage for coupling relief cars to dead cars, it is obvious that it is equally adapted for use in coupling trailers to a motor car, and the device is so constructed that it will pull the back car, hold it back going down hill, and will steer it to follow the motor car. The extension 32 may be above or below the axle 3, as may be most convenient. In case the connection cannot be easily made beneath the axle, the clip 24 is reversed to bring the extension 32 above the axle. In case of cars having the connecting rod 40 in front of the axle, the element 33 would also be connected in front of the axle, for instance through one of the arms 25 of the clip.

The clamp 37—38 may be attached to the connecting rod 40 at the opposite end of the said rod if desired, since these elements may swing freely toward either end of the axle. It will be evident from the description, that the driver of the front or motor car, may draw as many trailers as may be desired, without any one to steer, the steering being automatic.

It will be noticed that the out-turned ends of the links 7 which connect with the clips 12—13 have openings through which bolts or cotter pins are passed to prevent displacement of the links. It will be understood that if desired the section 37 may be also grooved to fit the steering rod, and that the clamp for the front axle may be reversed if desired.

We claim:

1. A coupling device for automobiles comprising a threaded rod having at one end a head, links hinged to the head at one end, a clamp for engaging the rear axle of one car hinged to the opposite end of each link to swing on axes parallel with the axle, a substantially rectangular frame with which the rod is slidably engaged, a stop nut threaded onto the rod, a coil spring arranged between the nut and the frame, a clip pivoted to the opposite end of the frame on a horizontal axis, a substantially U-shaped clamp support for engaging over the front axle on the rear vehicle and pivoted to the clip on a vertical axis, clamping blocks within the support and engaging the opposite face of the axle, means for clamping the blocks on the axle, one of the arms of the clip being extended beyond the axle, a clamp for engaging the connecting rod between the steering knuckles, and a connection between the said clamp and the extended arm.

2. A coupling device for automobiles comprising a threaded rod having at one end a head, links hinged to the head at one end, a clamp for engaging the rear axle of one car hinged to the opposite end of each link to swing on axes parallel with the axle, a substantially rectangular frame with which the rod is slidably engaged, a stop nut threaded onto the rod, a coil spring arranged between the nut and the frame, a clip pivoted to the opposite end of the frame on a horizontal axis, a clamp for engaging the front axle and pivoted to the clip on a vertical axis, one of the arms of the clip being extended beyond the axle, a clamp for engaging the connecting rod between the steering knuckles, and a connection between the said clamp and the extended arm.

3. A coupling device for automobiles, comprising a rod having links pivoted thereto, said links diverging and each link being provided with means for engaging the rear axle of a car, a clamp for engaging the front axle of another car, a frame pivoted to the clamp to swing on the vertical axis, and having a yielding connection with the rod, said frame having an extension, and a link pivoted to the extension and having a clamp for engaging the connecting rod between the steering knuckles of the second car.

EDWARD LEE COLQUITT.
HENRY PETWAY SPENCER.

Witnesses:
H. B. CLARK,
W. S. TIPTON.